May 5, 1959     O. BJERING     2,884,751
CONTAINER CLOSING APPARATUS

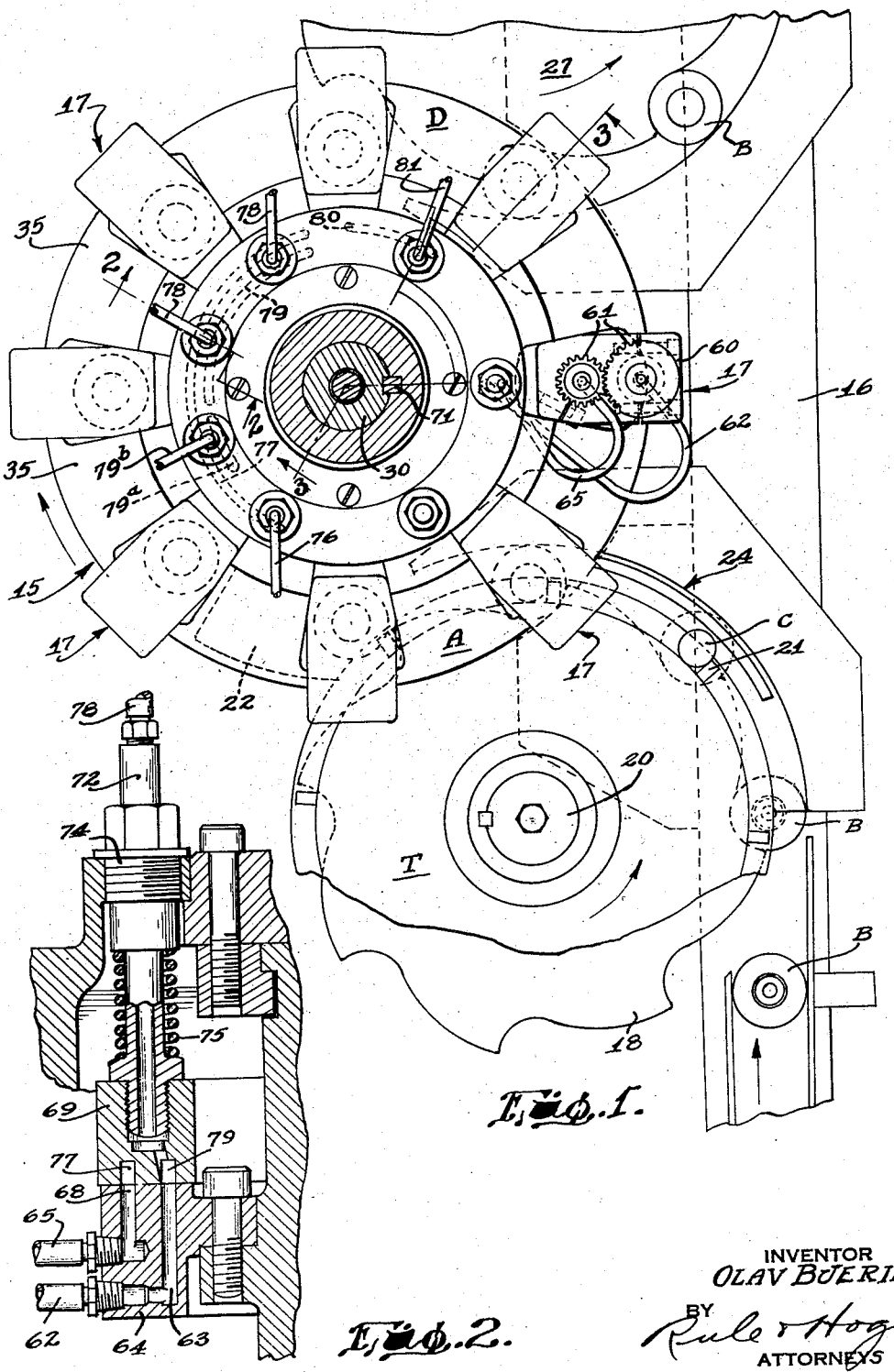

Filed Sept. 6, 1956     4 Sheets-Sheet 3

INVENTOR
OLAV BJERING
BY
Rule & Hoge
ATTORNEYS

INVENTOR
OLAV BJERING

United States Patent Office 2,884,751
Patented May 5, 1959

2,884,751

CONTAINER CLOSING APPARATUS

Olav Bjering, Toledo, Ohio, assignor to Owens-Illinois Glass Company, a corporation of Ohio Application September 6, 1956, Serial No. 608,243

7 Claims. (Cl. 53—317)

The present invention relates to container closing apparatus and more particularly is a novel and exceptionally efficient, simple, mechanism for applying and affixing screw-threaded closure caps to bottles, jars and the like containers and regularly controlling the application torque.

An object of my invention is the provision of novel means for applying screw-threaded closure caps to bottles or jars subsequent to filling with the product being packed, and during movement of such filled containers through a vapor, or vacuum, sealing chamber, such for example as that incorporated in the machine shown in Hohl Patent No. 2,620,111 issued December 2, 1952.

Another object of my invention is the provision of a closure cap applying chuck in which a contractable resilient hollow ring, actuated by the introduction thereinto of air under pressure, for example, encircles and firmly grips the screw-threaded skirt of the closure cap.

A further object of my invention is the provision in a closure cap applying chuck, of cap engaging means in the form of a resilient hollow ring of rubber or rubber-like material, to the end that there can be no marring, scratching, or distortion of the skirt incident to screwing the caps onto the containers.

It is likewise an object of my invention to provide novel means for quickly releasing the closure caps from the chucks, such involving apparatus for effecting at least partial vacuumization of the resilient hollow ring whereby to expand it out of gripping engagement with the screw-threaded skirt.

Other objects will be in part apparent and in part pointed out hereinafter.

Fig. 1 is a fragmentary top plan view, with parts in section, showing a container closing apparatus incorporating my invention.

Fig. 2 is a fragmentary vertical sectional view taken substantially along the line 2—2 of Fig. 1.

Figure 4:
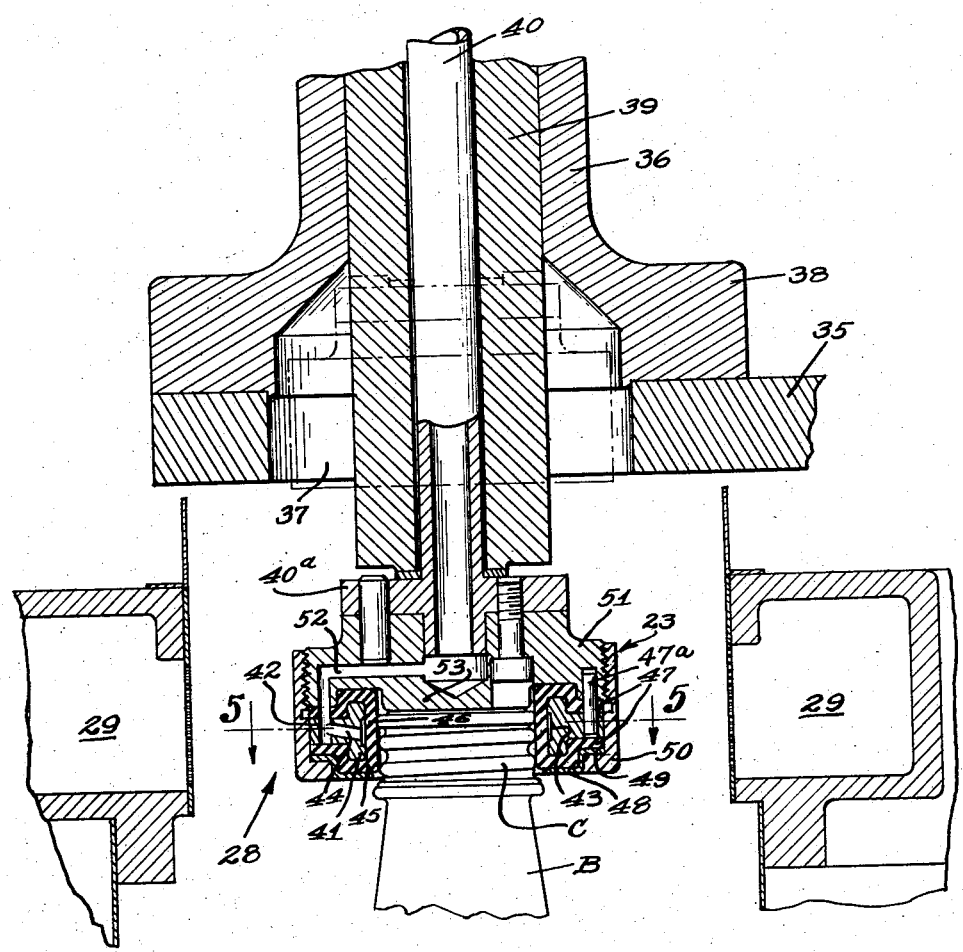
Fig. 4 is a fragmentary sectional view, on an enlarged scale, showing the closure cap chuck operatively positioned in a steam or vapor chamber.
Figure 5:
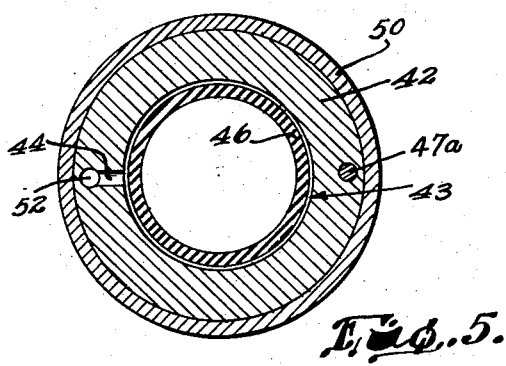
Fig. 5 is a sectional view taken substantially along the line 5—5 of Fig. 4.
Figure 6:
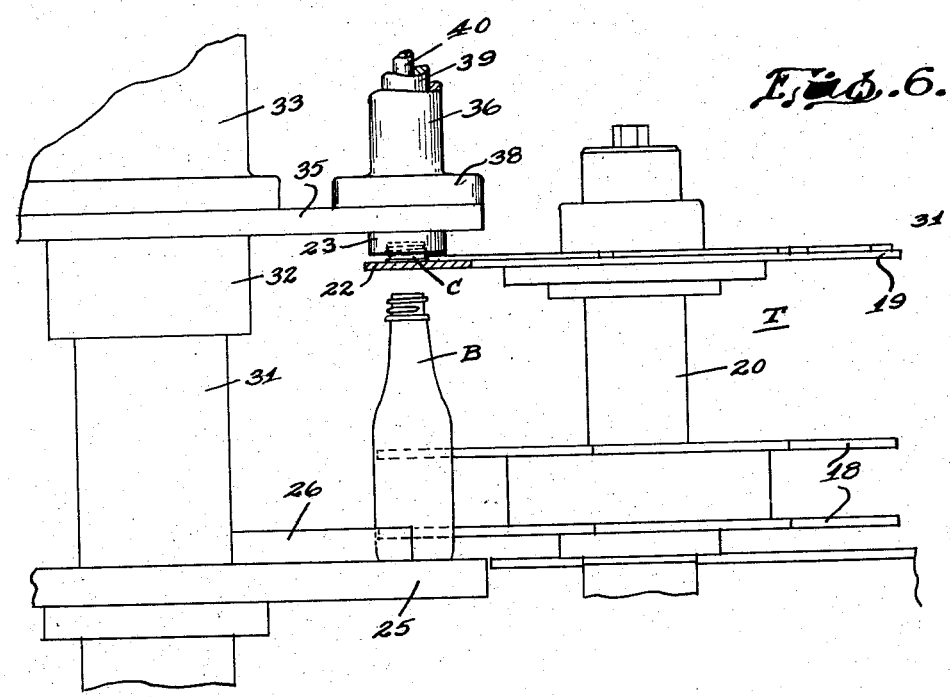
Fig. 6 is a side elevational view, with parts in section, more or less diagrammatically illustrating the closure cap handling mechanism associated with the container closing apparatus.
Figures 7, 8, 9:
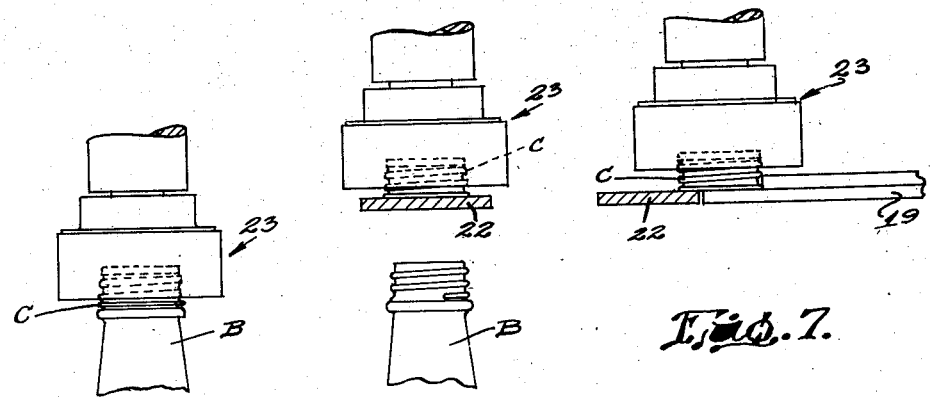

Figs. 7, 8 and 9 are views illustrating the successive positions of a closure cap during transfer of same from the handling mechanism shown in Fig. 6 to the cap applying chuck. Fig. 7 shows the closure cap about to be transferred from the rotary carrier or table to the stationary support. Fig. 8 shows the closure cap chuck about to pick up the closure cap from said stationary support. Fig. 9 shows the chuck applying the closure cap in the fashion illustrated in detail in Fig. 4.

One of the important purposes of my invention is to provide closure cap chucking means which is capable of satisfactorily applying screw-threaded closure caps, or lug-type closures, to filled bottles and jars during their passage through a vapor or steam chamber. As explained above, it is also important that the closure cap chuck be so constructed that incident to gripping and releasing closure caps, it will not mar or otherwise disfigure or distort such caps. Hence it preferably is formed of rubber or some rubber-like material.

Figure 3:
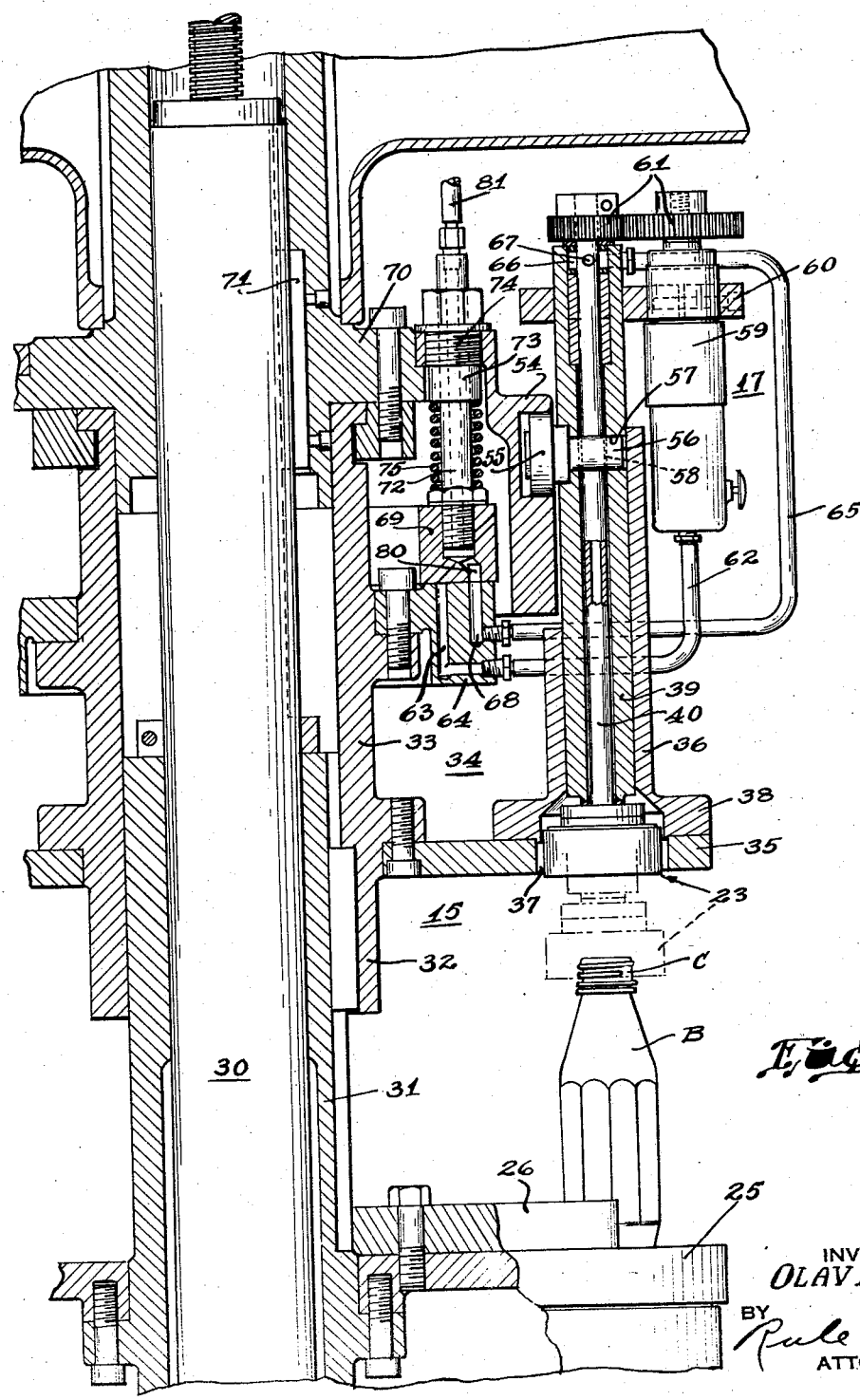
Fig. 3 is a partial vertical transverse sectional view taken substantially along the line 3—3 of Fig. 1.

By reference to Figs. 1 and 3 of the accompanying drawings, it will be observed that the container closing apparatus 15, incorporating my invention, is positioned alongside an endless horizontal conveyor 16 and mounted for continuous rotation about a vertical axis, whereby to bring the closure applying units 17 one at a time to a series of positions, or operating zones, as will be more fully explained hereinafter. In proximity to the filled container and closure cap receiving zone A of the closing apparatus 15 is a transfer unit T (Figs. 1 and 6) designed to bring filled bottles or jars B and closure caps C to said zone A. This unit comprises upper and lower star wheels 18 for advancing the bottles or jars and a rotary closure cap supporting disk 19 positioned above the pair of star wheels 18, both said star wheels and the disk being mounted for rotation with a common vertical shaft 20. As shown, the rotary disk 19 is provided on its upper surface near its periphery with an annular series of radial fingers, or abutments 21, which function to space the closure caps C apart uniformly and insure their proper delivery to the closing apparatus 15. Substantially at the entrance to the zone A these closure caps are moved by means (not shown) onto a stationary support 22 from which they are picked up by the closure cap chucks 23 in a fashion which will become apparent presently. The bottles B move along the conveyor 16 until the star wheels 18, together with an arcuate guide 24, remove them from this conveyor 16 and propel the bottles in succession to the receiving zone A, where they are deposited upon a rotary table 25 (Fig. 3), and in register with suitable holders 26 attached to the latter.

After the containers have been sealed, they are removed from the closing apparatus 15 at the discharge zone, or position D, by means of a continuously rotating star wheel 27 and once again deposited upon the conveyor 16, which in turn delivers such sealed containers to a packing station or table (not shown).

Incident to movement of the bottles from the receiving zone A to the discharge zone D and just prior to, as well as during, actual application of closure caps thereto, the upper portions of such containers and the closure caps move through a steam chamber 28 (Fig. 4) which obviously must be and is of arcuate contour and as shown, includes a pair of opposed steam or vapor injectors 29 positioned at opposite sides of the arcuate path of travel of the containers and closure cap chucks. By this arrangement steam or highly heated vapor in cloud formation fills the chamber 28 and the head space of the containers so that a quantity of such vapor or steam is entrapped in each sealed container. Incident to cooling and consequent condensation of such entrapped vapor, or steam, at least a partial vacuum is created in the sealed bottle or other container. This steam chamber may be of any preferred length as required by the specific containers, product, and other factors involved.

The closure applying units 17 (Fig. 1) are arranged in an annular series and rotatable about the stationary central column 30 (Figs. 1 and 3) and each such unit is positioned directly over one of the bottle or jar holders 26 and remains in register therewith at all times. The aforementioned table 25 and series of holders 26 are secured together and in turn mounted upon a lower sleeve 31 which encircles an intermediate portion of the stationary column 30. This sleeve 31 is splined to a downward tubular extension 32 on the upper sleeve 33 which comprises part of the rotary carriage or turret 34. A radial annular shelf 35, at the juncture of said upper sleeve 33 and the tubular extension 32, at least in part supports the closure applying units 17. Since these units 17 are identical in construction and operation, the ensuing description will be restricted to one such unit. It includes a vertical upstanding tubular guide 36 positioned coaxially with a vertical opening 37 in, and near the periphery of, the shelf 35 and formed with a bottom flange 38 which provides a base portion resting upon the shelf 35. Slidingly telescoped within this guide 36 is a tubular carrier 39 for the chuck 23 and within this carrier 39 is positioned a chuck supporting air tube 40 disposed coaxially with the carrier 39 and extending a short distance beyond each end of the latter. The air tube 40, which is directly connected at its lower end to the chuck 23, is of somewhat smaller outside diameter for a major part of its length than the inside diameter of the carrier 39 and, additionally, is formed of light gauge steel or similar resilient material so that it can flex laterally in the event the chuck and a bottle therebeneath are slightly out of alignment and compensate for such misalignment.

The chuck 23 (Fig. 4) which is suspended from the air tube 40 and carrier 39 comprises an annular core 41 which is in the form of a cylinder-like ring formed with an integral annular rib 42 encircling and projecting radially outward from said ring. The inner surface of this cylinder-like ring is formed with an annular channel 43 and a vacuum and air passageway or conduit 44 in the core 41 opens at one end into said channel 43. A contractable resilient gripping ring 45 embraces the core 41 and includes an annular inner wall 46 normally lying against the inner surface of the cylinder-like ring of the core. This gripping ring also includes a pair of axially spaced flanges 47 which lie against the upper and lower surfaces of the aforementioned rib 42. An annular confining ring 48 supports the lower side of the gripping ring and includes a marginal portion 49 lying between the lower flange 47 of the gripping ring 45 and a locking collar or nut 50 which is threaded onto a head portion 51 and together with the latter clamp the flange portions 47 firmly against the rib 42 of the core member. The aforementioned air tube 40 has a flange 40a secured to said head portion 51 and the axial opening through said tube communicates with a conduit 52 in said head, said conduit leading to the aforementioned passageway 44. Centrally of the head 51 is a depending boss 53 which is designed for contact with the panel portion of the closure C. To facilitate the assembling of the several parts, the core 41 and head 51 together with the upper of the two flanges 47 are provided with aligned vertical openings to accommodate a guide pin 47a which may well be carried by the head 51. Since this pin and the openings in the lower and upper flange members 47, when in register or alignment with one another, insure communication between the air and vacuum conduits or passageways 44 and 52, it is apparent that proper assembling of the parts is greatly facilitated.

As has been pointed out heretofore, this chuck 23 is subject both to axial reciprocation vertically and to rotary motion about its axis. Reciprocation of the chuck is obtained by means of a stationary continuous cam 54 (Fig. 3) which accommodates a cam roll 55, the latter being carried by a short horizontal rod 56 extending through diametrically opposed openings 57 in the carrier 39 and itself is formed with a vertical opening 58 which accommodates the aforementioned air tube 40. Thus, it is apparent that the air tube may be rotated independently of the carrier 39 and guide 36 in order to thread a closure upon a container and, additionally, may be reciprocated axially to move the chuck into and out of closure applying position.

Rotation of the air tube 40 is obtained by means of a turbine-type air motor 59 which can be purchased on the open market. This motor is mounted in an annular holder 60 and through a pair of meshing spur gears 61 has driving connection with the upper end of the air tube 40. Air under pressure to operate the motor 59 is delivered to the latter by way of a flexible tube 62 which is connected to an air conduit 63 formed in an annular ring 64 forming a part of an air and vacuum distributor incorporated in the rotary carriage 34.

For the purpose of introducing air under pressure into the gripping ring 46 and if desired exhausting air therefrom to the extent of producing a partial vacuum, a flexible tube 65 is connected at its upper end to an annular chamber 66 (Fig. 3) surrounding an upper portion of the air tube 40, the latter being provided with a radial port 67 positioned to create continuous communication between the interior of the air tube and said annular chamber 66. The lower end of this flexible tube 65 is connected to a conduit 68 which is formed in the aforementioned annular ring 64 radially outward from, but in proximity to, the conduit 63 through which air under pressure flows to the air motor 59. Both of these conduits 63 and 68 open through the upper side of said ring 64 which constitutes the rotating element of the air and vacuum distributor, there being an upper stationary ring 69 constituting the other major part of the distributor.

The container closing apparatus 15 rotates in a clockwise direction (Fig. 1) and the cycle of operations of any one of the units 17 involves, first, lowering of the chuck 23 by means of the cam 54 and cam roll 55 so that it telescopes over and the gripping ring supportingly engages a closure cap substantially at the time the latter moves onto the stationary support 22 or shelf as shown in Figs. 7 and 8. Immediately following picking up of the closure on the part of the chuck and movement thereof beyond the shelf or support 22, the bottle B and the closure cap enter the steam or vacuum zone 28 so that vapor enters and fills the head space in the bottle. The cam 54 thereupon lowers the chuck 23 to the full line positions of Figs. 4 and 9 and the dotted line position of Fig. 3 and substantially simultaneously therewith air under pressure is introduced through the air tube 40 to the interior of the gripping ring to thereby contract the latter into firm holding engagement with the closure cap skirt. Upon completion of the introduction of vapor or steam and with the gripping ring still firmly engaged with the cap skirt, air under pressure is introduced into the air motor 59 so that it will operate to rotate the chuck 23 in a clockwise direction and thereby securely thread the cap upon the bottle neck. Upon the completion of this cap applying operation, the air line to the tube 40 will be opened to the atmosphere in any conventional manner (not shown) and the supply of air from the distributor to the tube 65 shut off. This permits return of the gripping ring to its normal position out of snug contact with the cap skirt so that the cam 54 may elevate the chuck sufficiently to clear the upper end of the bottle B and permit removal of same by the star wheel 27. As a means for assisting in disengaging the gripping ring from the closure cap and effecting such disengagement quite rapidly and positively the air may be drawn from the interior of the ring through the tubes 40 and 65 so that at least a partial vacuum is formed in the gripping ring. By reference to Figs. 1, 2 and 3, the mechanism for actuating the chucks in the fashion just described will be understood. In the first place, it will be noted that the lower ring 64 of the air and vacuum distributor is secured to the upper sleeve 33 of the rotary carriage 34 so that these elements rotate together as a unit. The upper stationary ring 69 of the distributor is secured to the cam carrier 70 which is held against rotation by means of a spline 71 connecting it to the central column 30. The securing means for the stationary ring 69 may well comprise a plurality of vertical tubes 72 anchored by screw threads or the like at their lower ends in said ring and at their upper ends being slidably mounted in guides 73 which are secured in openings in said carrier 70 by means of lock nuts 74. Coil springs 75 interposed between the guides 73 and the ring 69 and encircling the tubes 72, serve to yieldingly hold the two rings of the distributor in snug sliding contact with each other so as to insure against the loss of either air pressure or vacuum, while permitting free relative rotation of the rings. Several of these tubes, as indicated in Fig. 1, have flexible pipe connections at their upper ends which lead either to a source of air under pressure or vacuum (not shown). In Fig. 1, the flexible pipe 76 is an air pressure supply line through which air under pressure is delivered continuously to an arcuate channel 77 formed in the lower surface of the stationary ring 69. This channel 77 is of such length that it insures firm gripping of a closure cap by a chuck 23 during all stages of the application of the closure cap to a bottle. The two air pressure supply pipes 78 (Fig. 1) conduct air under pressure to a relatively short arcuate channel 79 which at times registers with the air conduit 63 in the rotary ring of the distributor, as shown in Fig. 2. Beyond these two concentric channels 77 and 79, the stationary ring 69 is formed with a relatively short vacuum slot or channel 80 of arcuate form, such being in constant communication with the vacuum supply tube 81.

Briefly reviewed, the operation, which perhaps is obvious from the foregoing description, involves delivery of bottles with closures spaced thereabove and in register or alignment with the bottles, to the closing apparatus 15, substantially in the fashion indicated in Figs. 7, 8 and 9. Immediately after supporting engagement of a chuck with a closure has been effected (Fig. 8) the closure cap moves away from the shelf or support 22 and substantially simultaneously therewith air under pressure from the arcuate channel 77 (Figs. 1 and 2) is delivered to the tubes 65 and 40 and thence to the interior of the contractable gripping ring which forms a part of the chuck 23. This results in firm gripping of the closure cap skirt by the chuck so that at a later point in the cycle of operations the chuck and closure cap may be rotated as the result of introducing air under pressure into the motor 59 in part by way of the aforementioned arcuate slot 79. It will be noted that there are two sources of supply of air under pressure to this channel 79, such being for the purpose of balancing the pressure throughout the length of said channel. As has been explained previously, the neck portion of the bottle and the closure move through a cloud of steam or highly heated vapor just prior to sealing, to the end that a quantity of such steam or vapor will be entrapped in the head space and result in the creation of at least a partial, or in any event, a high vacuum upon cooling and condensation of the steam. Upon completion of the closure cap applying operation, the air under pressure within the gripping ring is released to the atmosphere, and if desirable, connection to a source of vacuum by way of the channel 80 and pipe 81 is effected to quickly release the applied closure cap from the holding influence of the chuck. Immediately, the cam 54 lifts the chuck sufficiently to permit removal of the sealed bottle by means of the star wheel 27, or some other suitable transfer means.

For the purposes of insuring quick positive starting of the motor 59, I have provided a short high pressure air slot 79a (Fig. 1) in the stationary ring 69 (Fig. 3) connected by a tube similar to the previously mentioned tube 72 to a high pressure air line 79b. The lines 78 referred to heretofore are for low pressure air.

On the matter of torque control, the pressure of the air supplied to the motor 59 determines the point at which it will stall during application of a closure cap. In other words the stalling torque is equal to the closure cap application torque. Therefore I vary the closure cap application torque as required by the size of cap, simply by effecting the necessary change in the pressure of air delivered to the air lines 78 (Fig. 1) by any suitable conventional device (not shown).

Modifications may be resorted to within the spirit and scope of the appended claims.

I claim:

1. In a chuck for applying screw-threaded closure caps to bottles and jars, a core member comprising an annular ring in the form of a cylinder, a radial rib encircling and formed as a part of the ring, a contractable hollow gripping ring embracing said core member and including axially spaced flange portions lying against opposite sides of the radial rib, said gripping ring also including a radially movable inner wall normally lying against the inner surface of the core ring, means for clamping said flanges and rib together and confining the gripping ring against both radially outward and axial expansion and means providing an air and vacuum passageway leading to the interior of the gripping ring.

2. The combination defined in claim 1, said core ring having an annular channel facing the adjacent surface of the gripping ring and the air and vacuum passageway having one end opening into said channel.

3. The combination defined in claim 1 the hollow gripping ring being formed of resilient, relatively non-porous material.

4. In combination a horizontal container supporting table rotatable about a vertical axis to thereby bring upright unsealed containers in succession to closure cap affixing and sealed container removing zones, an annular series of container holders on said table, a vertically movable rotatable closure cap supporting and affixing chuck above each container holder, means for effecting insertion of screw threaded closure caps into the chucks in advance of their arrival at the closure cap affixing zone, and cam mechanism for reciprocating and rotating the chucks in synchronism with their arrival in said zones whereby to secure the closure caps in sealing position on the containers, the chuck rotating mechanism including an air motor for each chuck and power transmitting means interposed between the motor and chuck.

5. In combination, a chuck for applying skirted screw-threaded closure caps to screw-threaded necks of bottles and jars comprising, a rigid ring-like holder, a hollow contractable skirt gripping ring within and coaxial with said holder and confined thereby against both radially outward expansion and axial expansion and contraction, means for creating pneumatic pressure within the skirt gripping ring to thereby contract a portion of the latter into firm gripping engagement with the exterior of a closure cap skirt comprising, a conduit leading to the interior of the ring, and means for supplying air under pressure to the conduit, means for reciprocating the chuck axially to and from a position in which it encircles the closure cap skirt comprising, a cam, a sleeve-like carrier for and coaxial with the tube and chuck, a cam roll mounted on the carrier and movable axially therewith under control of said cam to bring the chuck into engagement with a closure and chuck rotating means comprising a flexible supporting tube arranged within the sleeve-like carrier for limited lateral flexing therein, said tube connected to and axially aligned with the chuck, a motor and power transmitting means between said motor and tube.

6. In combination, a chuck for applying skirted screw-threaded closure caps to screw-threaded necks of bottles and jars comprising, a rigid ring-like holder, a hollow contractable skirt gripping ring within and coaxial with said holder and confined thereby against both radially outward expansion and axial expansion and contraction, means for creating pneumatic pressure within the skirt gripping ring to thereby contract a portion of the latter into firm gripping engagement with the exterior of a closure cap skirt, means for rotating the chuck and means operating in synchronism with actuation of the rotating means for reciprocating said chuck axially to and from a position in which it encircles the closure cap skirt, the chuck rotating means comprising a flexible supporting tube connected to and axially aligned with the chuck, a turbine-type air motor mounted in proximity to said supporting tube and power transmitting means between the motor and tube.

7. In combination, a chuck for applying skirted screw-threaded closure caps to screw-threaded necks of bottles and jars comprising, a rigid ring-like holder, a hollow contractable skirt gripping ring within and coaxial with said holder and confined thereby against both radially outward expansion and axial expansion and contraction, means for creating pneumatic pressure within the skirt gripping ring to thereby contract a portion of the latter into firm gripping engagement with the exterior of a closure cap skirt comprising, a conduit leading to the interior of the ring, and means for supplying air under pressure to the conduit, means for reciprocating the chuck axially to and from a position in which it encircles the closure cap skirt comprising, a cam, a sleeve-like carrier for and coaxial with the tube and chuck, a cam roll mounted on the carrier and movable axially therewith under control of said cam to bring the chuck into engagement with a closure and chuck rotating means comprising, a flexible supporting tube arranged within the sleeve-like carrier for limited lateral flexing therein, said tube connected to and axially aligned with the chuck, a motor and power transmitting means between said motor and tube, there being a horizontal rod supporting the cam roll, said rod mounted in the sleeve-like carrier and formed with a vertical opening through which the chuck supporting tube extends.

References Cited in the file of this patent

UNITED STATES PATENTS

| | | |
|---|---|---|
| 1,703,457 | Robertson | Feb. 28, 1929 |
| 2,106,365 | Tiano | Jan. 25, 1938 |
| 2,625,312 | Kantor | Jan. 13, 1953 |
| 2,705,101 | Everett | Mar. 29, 1955 |